(12) United States Patent
Schlienger et al.

(10) Patent No.: US 8,794,298 B2
(45) Date of Patent: Aug. 5, 2014

(54) SYSTEMS AND METHODS FOR FILTERING MOLTEN METAL

(75) Inventors: Max Eric Schlienger, Napa, CA (US); Paul Anthony Withey, Derby (GB); Michael Christopher Maguire, Napa, CA (US); Michael Dean Baldwin, Napa, CA (US)

(73) Assignee: Rolls-Royce Corporation, Indianapolis, IN (US)

( * ) Notice: Subject to any disclaimer, the term of this patent is extended or adjusted under 35 U.S.C. 154(b) by 0 days.

(21) Appl. No.: 12/979,614

(22) Filed: Dec. 28, 2010

(65) Prior Publication Data

US 2011/0240245 A1   Oct. 6, 2011

Related U.S. Application Data

(60) Provisional application No. 61/291,042, filed on Dec. 30, 2009.

(51) Int. Cl.
*B22C 9/08* (2006.01)
*B22D 43/00* (2006.01)

(52) U.S. Cl.
USPC .......................................... 164/134; 164/358

(58) Field of Classification Search
USPC ................................................. 164/134, 358
See application file for complete search history.

(56) References Cited

U.S. PATENT DOCUMENTS

| | | | |
|---|---|---|---|
| 4,568,595 A | 2/1986 | Morris | |
| 5,045,111 A | 9/1991 | Sane et al. | |
| 5,348,073 A * | 9/1994 | Kubo et al. | 164/457 |
| 5,384,171 A * | 1/1995 | Prucher | 428/34.4 |
| 6,203,593 B1 * | 3/2001 | Tanuma et al. | 75/407 |
| 6,289,969 B1 * | 9/2001 | Outten et al. | 164/134 |
| 6,547,967 B1 | 4/2003 | Adler et al. | |
| 7,138,084 B2 | 11/2006 | Bell et al. | |
| 7,527,671 B1 | 5/2009 | Stuecker et al. | |
| 2006/0284351 A1 | 12/2006 | Olson, III et al. | |
| 2007/0007699 A1 * | 1/2007 | Rynerson et al. | 264/497 |
| 2007/0084789 A1 | 4/2007 | Aufderheider et al. | |
| 2007/0090047 A1 | 4/2007 | Bell et al. | |
| 2007/0110988 A1 | 5/2007 | Binkle et al. | |
| 2009/0071293 A1 | 3/2009 | Juma | |

FOREIGN PATENT DOCUMENTS

WO   WO 02/32545 A1   4/2002
WO   WO 2006/045002 A2   4/2006

OTHER PUBLICATIONS

International Search Report and Written Opinion, PCT/US2010/062496, Rolls-Royce Corporation, Feb. 27, 2012.
Extended European Search Report, EP 10841718.9, Apr. 16, 2013, Rolls-Royce Corporation.

* cited by examiner

*Primary Examiner* — Kevin P Kerns
(74) *Attorney, Agent, or Firm* — Krieg DeVault LLP (57) ABSTRACT

One embodiment of the present invention is a unique filter and a method for manufacturing the same. Another embodiment is a unique system for casting a metallic object. Another embodiment is a unique method of filtering a molten metal. Other embodiments include apparatuses, systems, devices, hardware, methods, and combinations for filtering molten metal. Further embodiments, forms, features, aspects, benefits, and advantages of the present application shall become apparent from the description and figures provided herewith.

18 Claims, 5 Drawing Sheets

SYSTEMS AND METHODS FOR FILTERING MOLTEN METAL

CROSS REFERENCE TO RELATED APPLICATIONS

The present application claims the benefit of U.S. Provisional Patent Application 61/291,042, filed Dec. 30, 2009, and is incorporated herein by reference.

FIELD OF THE INVENTION

The present invention relates to filters, and more particularly, to systems and methods for filtering molten metal.

BACKGROUND

Filtration systems for filtering liquids, e.g., molten metal, remain an area of interest. Some existing systems have various shortcomings, drawbacks, and disadvantages relative to certain applications. Accordingly, there remains a need for further contributions in this area of technology.

SUMMARY

One embodiment of the present invention is a unique filter and a method for manufacturing the same. Another embodiment is a unique system for casting a metallic object. Another embodiment is a unique method of filtering a molten metal. Other embodiments include apparatuses, systems, devices, hardware, methods, and combinations for filtering molten metal. Further embodiments, forms, features, aspects, benefits, and advantages of the present application shall become apparent from the description and figures provided herewith.

BRIEF DESCRIPTION OF THE DRAWINGS

The description herein makes reference to the accompanying drawings wherein like reference numerals refer to like parts throughout the several views, and wherein.

DETAILED DESCRIPTION

For purposes of promoting an understanding of the principles of the invention, reference will now be made to the embodiments illustrated in the drawings, and specific language will be used to describe the same. It will nonetheless be understood that no limitation of the scope of the invention is intended by the illustration and description of certain embodiments of the invention. In addition, any alterations and/or modifications of the illustrated and/or described embodiment(s) are contemplated as being within the scope of the present invention. Further, any other applications of the principles of the invention, as illustrated and/or described herein, as would normally occur to one skilled in the art to which the invention pertains, are contemplated as being within the scope of the present invention.

Casting processes, e.g., investment casting and other casting processes produce components by pouring a liquid (often a metal) into a shaped cavity and subsequently allowing that liquid to solidify into the shape of the cavity. In many instances the liquid (or molten metal) may have impurities in the form of non-liquid contaminants within it. Such contaminants, or inclusions, may result in unacceptable defects if they are allowed to make their way into the castings. Effective filtration of the liquid can provide considerable improvements in process yield. However, traditional manufacturing techniques are typically unable form the complex paths desired for good filtration. An additional complication is that filtration of most molten metal requires a ceramic filter, and ceramics are difficult to form into the fine complex shapes required for filtering the molten metal.

Although it may be possible to manufacture a ceramic filter by infiltrating a volume of polystyrene foam spheres with ceramic slurry, and subsequently firing the ceramic slurry while burning out the polystyrene foam, such a manufacturing route results in a component wherein the ceramic ligaments have a varying cross-section. In particular, at locations where spheres were touching or in close proximity, the fired ceramic may be extremely thin. These thin sections may be fragile, and under investment casting conditions may break off thereby causing the filters themselves to become an inclusion source. Another technique that might yield a fine pore size may be to pack ceramic or polymeric particles to yield a filter made of the interstices. However, this approach would leave a large volume of the filter unavailable for use, since it is filled with the particles. The inventors address such concerns, in one aspect of the present invention, by controlling some or all aspects of the filter via an engineered and electronically defined geometry, e.g., including defining pore size and the tortuosity of the flow path(s) for the molten metal that is to be filtered.

Figure 1:
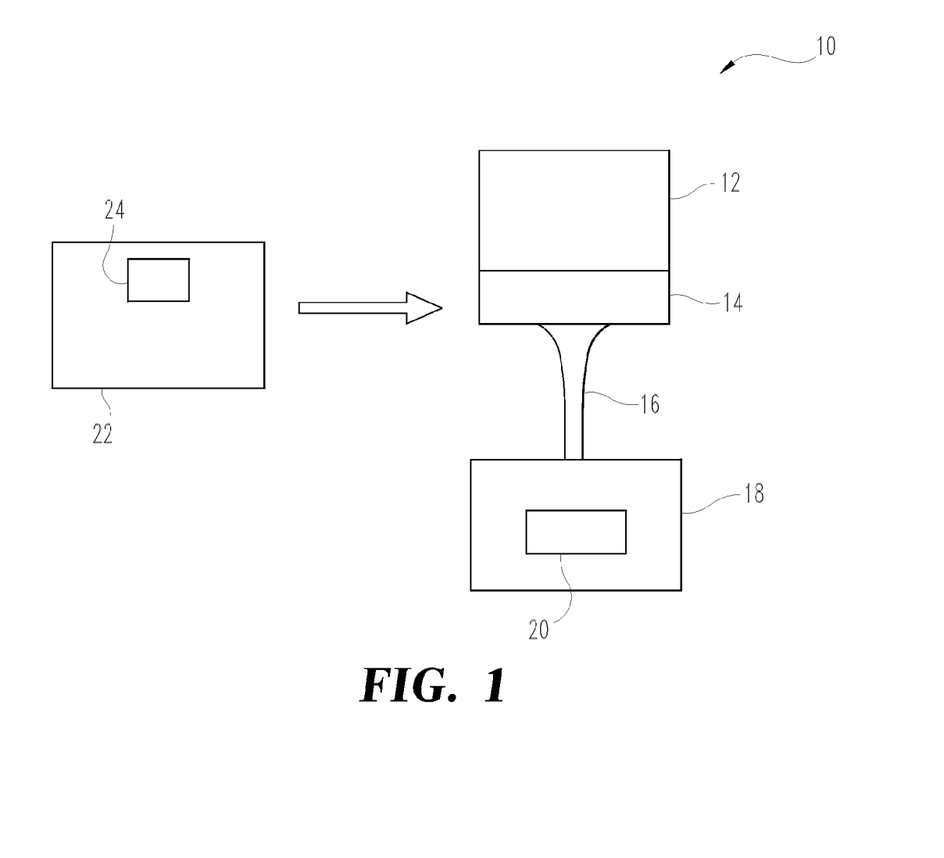
FIG. 1 schematically illustrates a non-limiting example of a system for casting a metallic object in accordance with an embodiment of the present invention.

Referring now to the drawings, and in particular, FIG. 1, there is schematically illustrated a non-limiting example of a system 10 for casting a metallic object, such as a gas turbine engine component, in accordance with an embodiment of the present invention. In one form, system 10 includes a crucible 12, a ceramic filter 14 for filtering a molten metal 16, and a mold 18. In one form, crucible 12 is a transfer crucible that is operative to transfer molten metal 16 to mold 18 from another crucible that is used to melt a metal. In another form, crucible 12 is used to both melt the metal and transfer the molten metal to mold 18. In one form, the metal is an alloy employed in creating a cast gas turbine engine component, such as an airfoil or a static structural component. The gas turbine engine component may be formed one or more alloys, such as a nickel-based superalloy, an aluminum alloy and/or a titanium alloy.

Ceramic filter 14 is operative to receive molten metal 16, capture impurities that might otherwise form inclusions in the cast metallic object, and discharge molten metal 16. In particular, filter 14 is operative to capture impurities from molten metal 16 prior to molten metal 16 entering the one or more cavities in mold 18 that define the cast metallic object. Ceramic materials used to form ceramic filter 14 contemplated herein include, but are not limited to, alumina, zirconia, silica, yttria, magnesia, and mixtures thereof. In one form, filter 14 is formed separately from both crucible 12 and mold 18. In other embodiments, filter 14 may be formed integrally with one or both of crucible 12 and mold 18. In one form, filter 14 is fitted to a portion of crucible 12. In other embodiments, filter 14 may be fitted to a portion of mold 18 or otherwise disposed in an arrangement suitable for receiving molten metal 16 from crucible 12 and for discharging molten metal 16 for reception into mold 18.

Mold 18 includes one or more internal cavities 20, such as chambers and/or passages that define the internal and/or external geometry of the cast metallic object. In one form, one or more of cavities 20 are defined at least in part by a core, such as a ceramic core (not shown). Mold 18 may also include one or more gates and risers, e.g., to accommodate the flow of the molten metal, to help ensure adequate filling of cavities 20 with molten metal, and to backfill molten metal 16 to accommodate shrinkage during the solidification of molten metal 16 in various parts of mold 18. Mold 18 is operative to receive the filtered molten metal 16 and form the cast metallic object.

In one form, system 10 also includes a stereolithography system 22 operative to fabricate ceramic filter 14 based on an electronic model 24. In one form, stereolithography system 22 is operative to form ceramic filter 14 in the form of a green body, which is sintered prior to use as a filter. Filter 14 is electronically defined e.g., using commercially available stereolithography computer aided design (CAD) software to generate electronic model 24, e.g., in the form of an STL (.stl) file. Electronic model 24 is supplied to system 22, which fabricates filter 14.

Figure 2:
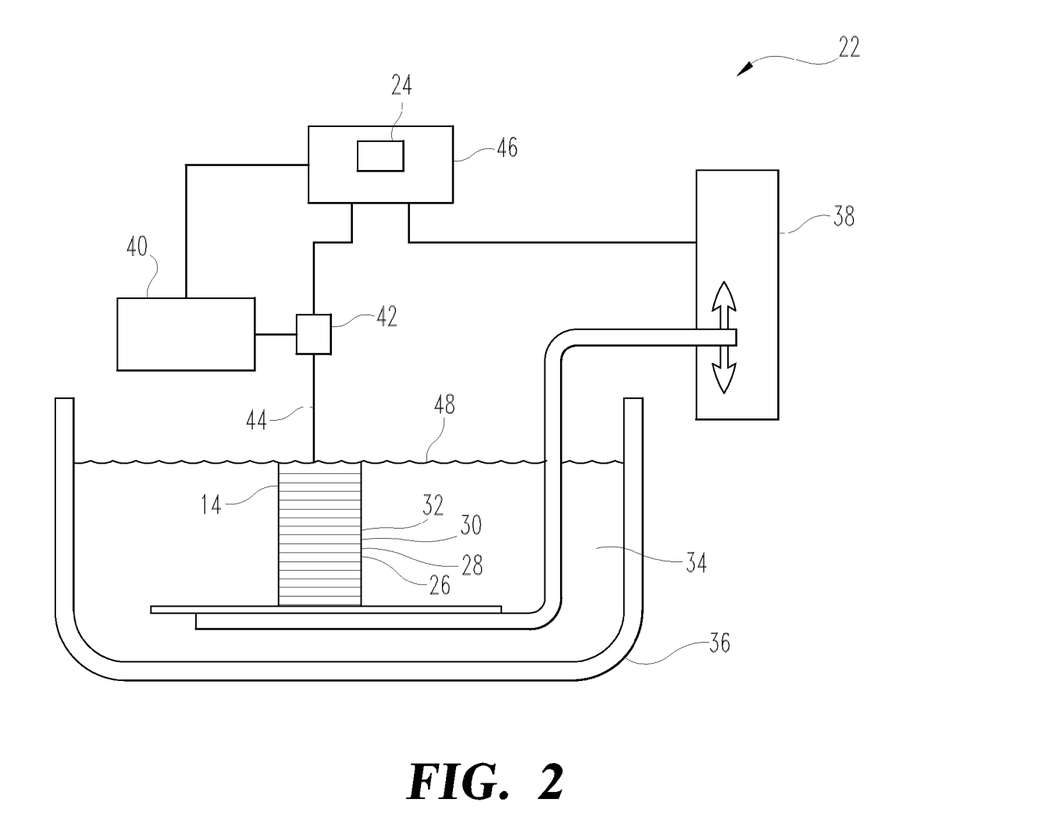
FIG. 2 schematically illustrates a non-limiting example of a stereolithography system for freeform fabrication of a ceramic filter in accordance with an embodiment of the present invention.

Referring to FIG. 2, there is schematically illustrated a non-limiting example of stereolithography system 22 for freeform fabrication of ceramic filter 14 in accordance with an embodiment of the present invention. In one form, system 22 is a selective laser activation (SLA) stereolithography system. Selective laser activation is based upon a stereolithography process that utilizes resins which solidify when exposed to an energy dose. While the present application will be generally described with respect to an SLA stereolithography system, it is equally applicable to other stereolithography systems, such as flash cure systems and other forms of scanned cure systems.

System 22 is operable to create ceramic filter 14 from electronic model 24 as a three dimensional ceramic component formed of a plurality of layers, some of which are labeled as layers 26, 28, 30 and 32. In one form, stereolithography system 10 employs a ceramic loaded resin 34 disposed in a resin containment reservoir 36; an elevation-changing member 38; a laser source 40 and a scanning device 42 operative to scan a laser beam 44 across elevation changing member 38; and a controller 46.

Resin containment reservoir 36 is filled with a quantity of ceramic loaded resin 34 from which ceramic filter 14 is fabricated. In one form, ceramic loaded resin 34 includes the ceramic material used to create filter 14 in the form of ceramic particles mixed with a photo-polymerizable monomer(s) and/or oligomer(s). The present application contemplates the use of an oligomer(s) resin alone or in combination with a monomer resin. In one form, ceramic loaded resin 34 contains a photoinitiator. In another form, ceramic loaded resin 34 contains a dispersant in addition to the photoinitiator.

Controller 46 is communicatively coupled to elevation changing member 38, laser source 40 and scanning device 42. Controller 46 is configured to execute program instructions to form filter 14 using elevation changing member 38, laser source 40 and scanning device 42. In one form, controller 46 is microprocessor based and the program instructions are in the form of software stored in a memory (not shown). However, it is alternatively contemplated that controller 46 and the program instructions may be in the form of any combination of software, firmware and hardware, including state machines, and may reflect the output of discreet devices and/or integrated circuits, which may be co-located at a particular location or distributed across more than one location, including any digital and/or analog devices configured to achieve the same or similar results as a processor-based controller executing software or firmware based instructions.

Controller 46 is operative to control the operation of elevation changing member 38, laser source 40 and scanning device 42 to form each layer of ceramic filter 14 based on electronic model 24 by selectively providing polymerizing energy doses to each layer. Scanning device 42 scans laser beam 44 from laser source 40 across ceramic loaded resin 34, e.g., on a surface 48 of ceramic loaded resin 34, in the desired shape to form each layer of ceramic filter 14. The ceramic particles contained in ceramic loaded resin 34 ultimately form ceramic filter 14.

Ceramic filter 14 is freeform fabricated by system 22 in layer-by-layer fashion by applying the energy dose to cure a film of ceramic-laden photo-polymerizable resin into a polymerized layer; lowering elevation changing member 38 and applying a new film of the resin; and applying an energy dose sufficient to both photo-polymerize the new film of resin into a new layer and to provide an overcure to bind the new layer to the previous layer. In one form, each new resin film is formed over the topmost polymerized layer by lowering elevation changing member 38 to submerge the topmost polymerized layer in the ceramic loaded resin 34 in reservoir 36. The process is repeated to form a plurality of polymerized layers, i.e., layers of ceramic particles that are held together by a polymer binder, e.g., such as the illustrated layer 26, 28, 30 and 32. The successively formed cured layers ultimately form the three-dimensional shape of ceramic filter 14 having the desired three-dimensional features formed therein.

In one form, each polymerized layer is on the order of 0.05 mm (0.002 inches) thick. Thinner or thicker layers may be employed in other embodiments. For example, the thickness of each layer may vary with the needs of the particular application, including the desired resolution of the ceramic filter 14. It should be understood that embodiments of the present application may have any number of layers or thickness of layers. In addition, although only a single ceramic filter 14 is illustrated, it will be understood that in various embodiments, a plurality of ceramic filters 14 of the same and/or different configuration may be formed as a batch in system 22. In addition, although the present embodiment is described with respect to a ceramic filter for filtering molten metal, it will be understood that other embodiments include other filter types.

After the formation of ceramic filter 14, additional processing may be performed prior to use. In one form, ceramic filter 14 is subjected to burnout processing and sintering. In other embodiments, other additional processes may be performed in addition to or in place of burnout processing and sintering.

Figure 3:
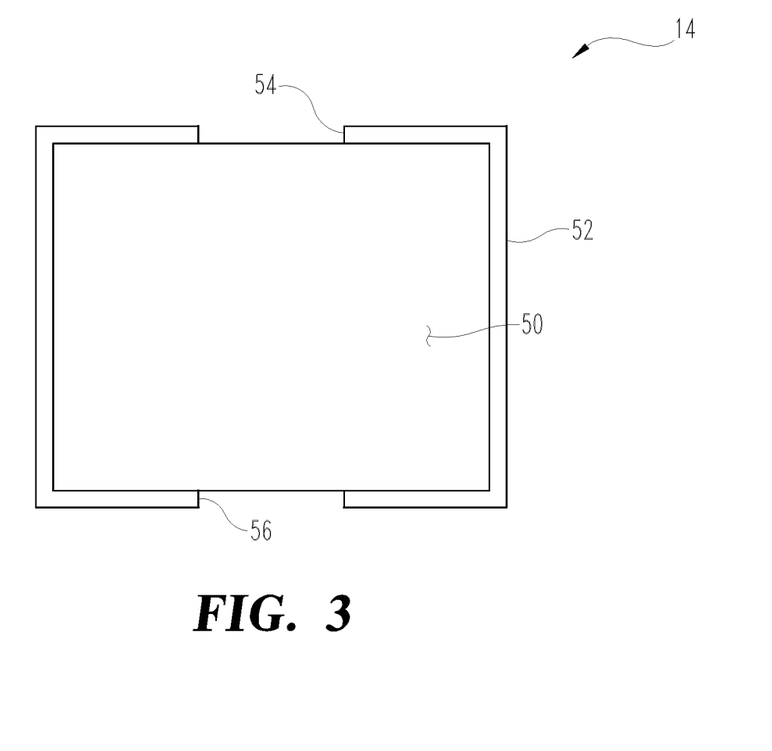
FIG. 3 schematically illustrates a non-limiting example of a ceramic filter in accordance with an embodiment of the present invention.

Referring now to FIG. 3, there is schematically illustrated a non-limiting example of ceramic filter 14 in accordance with an embodiment of the present invention. Ceramic filter 14 includes a filter mesh 50. In one form, filter 14 also includes an integral solid shell 52. In other embodiments, filter 14 may not include an integral shell. In one form, shell 52 includes an opening 54 and an opening 56. Opening 54 is operative to receive molten metal 16 from crucible 12. Opening 56 is operative to discharge the molten metal 16 into mold 18, in particular, cavities 20.

Filter mesh 50 is electronically defined in electronic model 24, e.g., using commercially available stereolithography computer aided design (CAD) software to generate electronic model 24 in the form of an STL (.stl) file. In one form, shell 52 is also electronically defined in electronic model 24. Electronic model 24 is supplied to system 22 and employed by controller 46 to direct the operations of laser source 40 and scanning device 42 to selectively cure and overcure subsequent layers in order to yield the desired three-dimensional filter 14. In one form, electronic model 24 provides point-by-point definition for each geometric feature of filter mesh 14, e.g., wherein each point is governed by the diameter of laser beam 44. Hence, in some embodiments, the diameter of laser beam 44, in conjunction with the thickness of each polymerized layer, determines the resolution of the geometric features of filter mesh 14.

In one form, filter mesh 50 is defined in electronic model 24 to include a plurality of three-dimensional interconnected passages having a geometry configured to capture contaminants from molten metal 16, e.g., based on velocities of the molten metal within filter mesh 50, the pore size and the tortuosity of the passages. In one form, anisotropic shrinkage of filter 14, in particular filter mesh 50, is controlled. In addition, structural aspects of filter mesh 50 are designed to withstand the loads and temperatures associated with filtering molten metal 16. In one form, the structural aspects include defining a minimum thickness of ceramic walls and/or ceramic ligaments within filter mesh 50.

Figure 4:
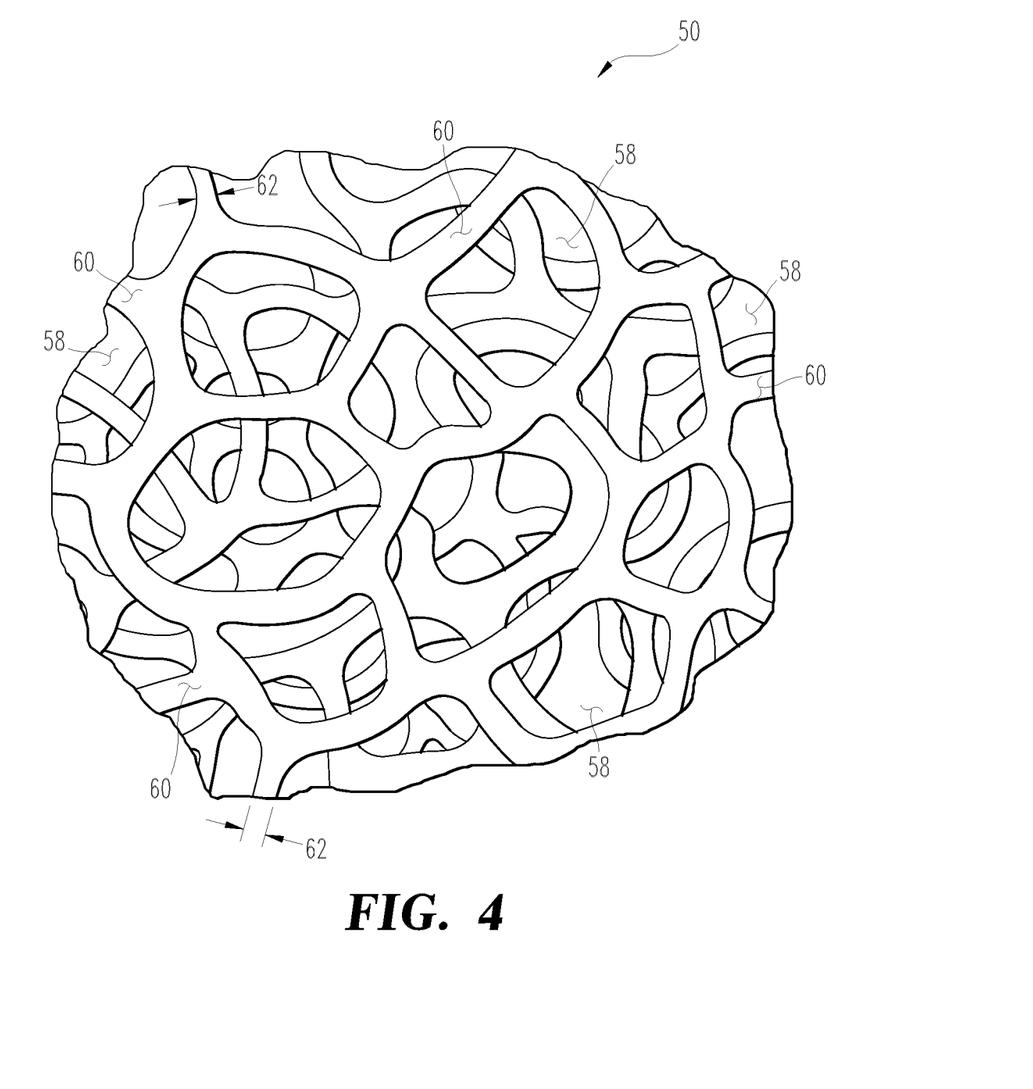
FIG. 4 depicts a non-limiting example of interconnected passages of a filter mesh in accordance with an embodiment of the present invention.

Referring now to FIG. 4, a non-limiting example of the interconnected passages of filter mesh 50 in accordance with an embodiment of the present invention is depicted. In the depiction of FIG. 4, the interconnected passages of filter mesh 50 are in the form of a plurality of pores 58 defined by a plurality of ceramic ligaments 60. The thickness 62 of ceramic ligaments has a minimum defined value designed to withstand the pressures associated with filtering molten metal 16. In the embodiment of FIG. 4, the size, shape and number of pores 58 and ligaments 60 are designed to control the velocity at which molten metal 16 flows through filter 14 and pores 58, and to capture contaminants in molten metal 16 as if flows through pores 58.

Figure 5:
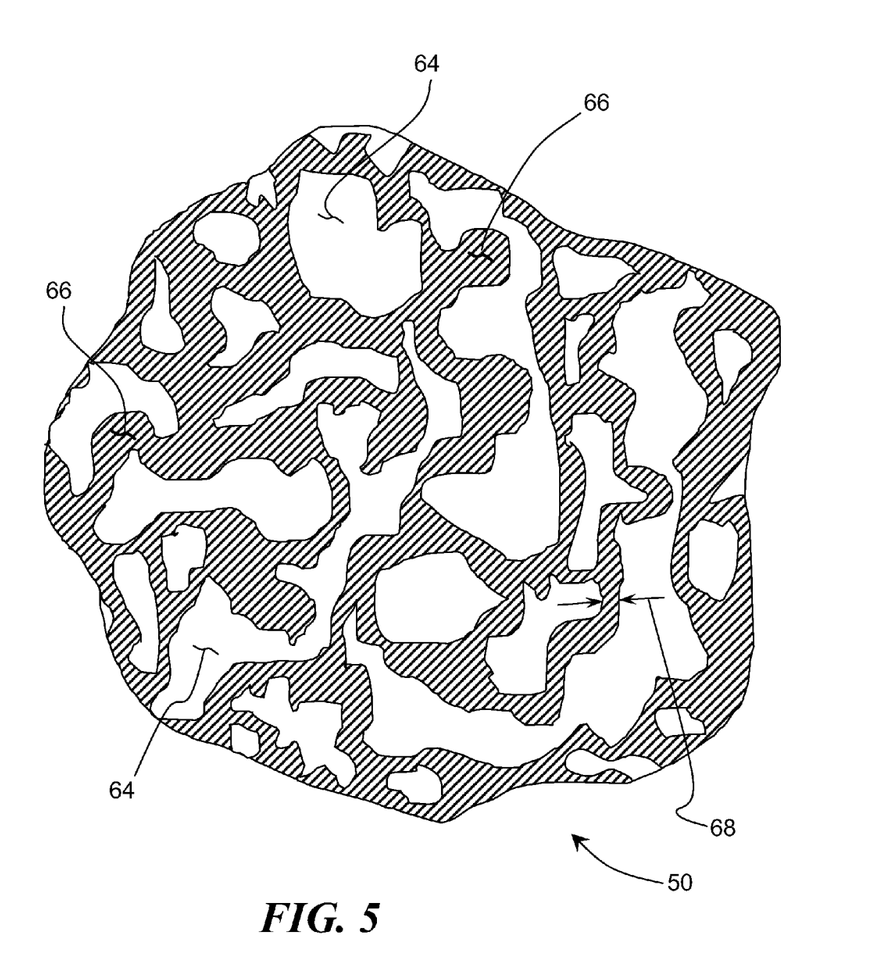
FIG. 5 depicts a non-limiting example of interconnected passages of a filter mesh in accordance with an embodiment of the present invention.

Referring now to FIG. 5, a non-limiting example of the interconnected passages of filter mesh 50 in accordance with another embodiment of the present invention is depicted. In the depiction of FIG. 5, the interconnected passages of filter mesh 50 are in the form of a plurality of interconnected openings 64 defined in solid ceramic structure 66. The wall thickness 68 of structure 66 between openings 64 has a minimum defined value designed to withstand the pressures associated with filtering molten metal 16. In the embodiment of FIG. 5, the size and shape of openings 64 are designed to control the velocity at which molten metal 16 flows through filter 14 and openings 64, and to capture contaminants in molten metal 16 as if flows through openings 64. In one form, the size and shape of each opening 64 varies although the length of each opening 64. In another form, the size of each opening 64 is constant along its length, e.g., wherein openings 64 are in the form of interconnecting holes of constant cross section extending through structure 66. In yet another form, structure 66 may be in the form of diagonally intersecting rods having a desired cross section, wherein openings 64 are defined by the spaces between the intersecting rods.

Embodiments of the present invention include a method of manufacturing a ceramic molten metal filter, comprising: defining a filter mesh having a plurality of three-dimensional interconnected passages with a geometry configured to capture contaminants from a molten metal; freeform fabricating the filter mesh using a polymerizable ceramic loaded resin; and sintering the filter mesh.

In a refinement, the method also includes defining a minimum thickness in the filter mesh, wherein the minimum thickness is designed to withstand pressures associated with filtering the molten metal.

In another refinement, the method also includes defining the plurality of interconnected passages to control a velocity of a flow of the molten metal.

In yet another refinement, the method also includes defining an integral shell disposed around the plurality of interconnected passages.

In still another refinement, the method also includes defining the shell to include a first opening operative to receive the molten metal, and to include a second opening operative to discharge the molten metal.

In yet still another refinement, the polymerizable ceramic loaded resin contains alumina.

Embodiments of the present invention include a method of filtering a molten metal, comprising: defining a filter mesh having a geometry operative to withstand loads and temperatures associated with filtration of the molten metal and to capture contaminants from the molten metal; operating a stereolithography machine to fabricate the defined filter mesh using a photo-polymerizable ceramic loaded resin; sintering the filter mesh; and pouring the molten metal through the filter mesh.

In a refinement, the filter mesh includes a plurality of interconnected passages.

In another refinement, the plurality of interconnected passages are defined by a plurality of intersecting holes in a solid matrix.

In yet another refinement, the plurality of interconnected passages include a passage having a size that varies along a length of the passage.

In still another refinement, the filter mesh is defined by a plurality of ceramic ligaments and a plurality of pores.

In yet still another refinement, the method further includes defining a minimum ligament thickness.

In a further refinement, the minimum ligament thickness is designed to withstand pressures associated with filtering the molten metal.

In a yet further refinement, the method includes controlling anisotropic shrinkage.

Embodiments of the present invention include a system for casting a metallic object from a molten metal, comprising: at least one of a crucible and a mold; and a ceramic filter operative to receive the molten metal and to capture impurities from the molten metal prior to the molten metal entering one or more cavities in the mold that form the metallic object, the ceramic filter having an electronically defined ceramic filter mesh operative to remove contaminants from the molten metal.

In a refinement, the system also includes a stereolithography system operative to fabricate the electronically defined ceramic filter mesh using a photo-polymerizable ceramic loaded resin.

In another refinement, the system also includes a controller configured to execute program instructions to direct the stereolithography system to form the ceramic filter based on an electronic definition of the electronically defined ceramic filter mesh.

In yet another refinement, the electronically defined ceramic filter mesh is structured to withstand pressures associated with filtering the molten metal.

In still another refinement, the system includes an integral shell disposed around the electronically defined ceramic filter mesh.

In yet still another refinement, the shell includes a first opening operative to receive the molten metal, and includes a second opening operative to discharge the molten metal.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:

1. A method of manufacturing a ceramic molten metal filter, comprising:
    electronically defining a filter mesh having a plurality of three-dimensional interconnected passages with a geometry configured to capture contaminants from a molten metal, the interconnected passages being in the form of a plurality of pores defined by a plurality of ceramic ligaments;
    wherein the electronically defining includes controlling aspects of the filter mesh via engineered and electronically defined geometries, including sizes, of the passages, and an engineered and electronically defined tortuosity of the passages;
    wherein the electronically defining includes electronically defining the thickness of the ligaments according to a prescribed molten metal velocity to be produced by the filter mesh;
    freeform fabricating the filter mesh using a polymerizable ceramic loaded resin; and
    sintering the filter mesh.

2. The method of claim 1, further comprising electronically defining a minimum thickness in the filter mesh, wherein the minimum thickness is designed to withstand pressures associated with filtering the molten metal.

3. The method of claim 1, further comprising electronically defining a shell disposed around the plurality of interconnected passages, wherein the shell is integral with the filter mesh.

4. The method of claim 3, further comprising electronically defining the shell to include a first opening operative to receive the molten metal, and to include a second opening operative to discharge the molten metal.

5. The method of claim 1, wherein the polymerizable ceramic loaded resin contains alumina.

6. A method of filtering a molten metal, comprising:
    electronically defining a filter mesh having a geometry operative to withstand loads and temperatures associated with filtration of the molten metal and to capture contaminants from the molten metal,
    wherein the filter mesh includes a plurality of interconnected passages through which the molten metal flows during filtering, the interconnected passages being in the form of a plurality of pores defined by a plurality of ceramic ligaments;
    wherein the electronically defining includes electronically defining an asymmetric variation in the geometries of at least some of the pores and ligaments; and
    wherein the size, shape and number of passages are engineered and electronically defined to capture contaminants in the molten metal as the molten metal flows through the filter mesh;
    operating a stereolithography machine to fabricate the defined filter mesh using a photo-polymerizable ceramic loaded resin;
    sintering the filter mesh; and
    pouring the molten metal through the filter mesh.

7. The method of claim 6, wherein the plurality of interconnected passages are electronically defined by a plurality of intersecting holes in a solid matrix.

8. The method of claim 6, wherein the plurality of interconnected passages include a passage having a size that varies along a length of the passage.

9. The method of claim 6, further comprising electronically defining a minimum ligament thickness.

10. The method of claim 9, wherein the minimum ligament thickness is designed to withstand pressures associated with filtering the molten metal.

11. The method of claim 6, further comprising controlling anisotropic shrinkage.

12. A system for casting a metallic object from a molten metal, comprising:
    at least one of a crucible and a mold; and
    a ceramic filter operative to receive the molten metal and to capture impurities from the molten metal prior to the molten metal entering one or more cavities in the mold that form the metallic object,
    said ceramic filter having an electronically defined ceramic filter mesh operative to remove contaminants from the molten metal, the ceramic filter including an integral shell that is coextensive with the filter mesh in a molten metal pouring direction and that is also electronically defined;
    wherein the electronically defined ceramic filter mesh includes controlled aspects of the filter mesh via engineered and electronically defined pore sizes in the filter for the molten metal to be filtered;
    wherein the pores are defined by a plurality of ceramic ligaments having minimum defined thickness values designed to withstand the pressures associated with filtering the molten metal; and
    wherein the pores and ligaments are designed to control the velocity at which the molten metal flows through the pores.

13. The system of claim 12, further comprising a stereolithography system operative to fabricate said electronically defined ceramic filter mesh using a photo-polymerizable ceramic loaded resin.

14. The system of claim 13, further comprising a controller configured to execute program instructions to direct said stereolithography system to form said ceramic filter based on an electronic definition of said electronically defined ceramic filter mesh.

15. The system of claim 12, wherein said shell includes a first opening operative to receive the molten metal, and includes a second opening operative to discharge the molten metal.

16. A method of manufacturing a ceramic filter configured to filter molten metal, comprising:

generating an electronic model of a filter mesh,
wherein the generating of the electronic model includes electronically defining, as part of the model, a plurality of three-dimensional interconnected passages in the form of a plurality of intersecting holes,
wherein the electronically defining includes electronically defining sizes, shapes and locations of each of the passages in the filter mesh according to a prescribed molten metal velocity to be produced by the filter mesh, and
electronically defining a wall thickness between passages, wherein the wall thickness is configured to withstand the pressures associated with filtering molten metal;
supplying the model to a freeform fabricating device;
operating the freeform fabricating device based on the model to produce the filter mesh using a polymerizable ceramic loaded resin; and
sintering the filter mesh.

17. A method of manufacturing a filter formed of ceramic material and configured to filter a molten metal, comprising:

electronically defining a plurality of three-dimensional interconnected passages to define a filter mesh for filtering the molten metal,
wherein the electronically defining includes electronically defining geometries of the passages in the filter mesh, and
electronically defining a ceramic shell integral with the filter mesh, and electronically defining the shell to have an opening to receive molten metal and an opening to discharge molten metal;
supplying the model to a freeform fabricating device;
operating the freeform fabricating device based on the model to produce the filter mesh using a polymerizable ceramic loaded resin; and
removing the polymerizable resin from the filter mesh.

18. The method of claim 17, wherein the geometries of at least some of the passages are asymmetric.

* * * * *